(12) United States Patent
Koch

(10) Patent No.: US 6,663,163 B2
(45) Date of Patent: Dec. 16, 2003

(54) COVER DEVICE FOR A FOLDING TOP COMPARTMENT

(75) Inventor: Michael Koch, Sindelfingen (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/193,702

(22) Filed: Jul. 12, 2002

(65) Prior Publication Data
US 2003/0020298 A1 Jan. 30, 2003

(30) Foreign Application Priority Data
Jul. 14, 2001 (DE) .......................... 101 34 370

(51) Int. Cl.[7] .................................................. B60J 7/00
(52) U.S. Cl. ..................... 296/107.08; 296/107.01; 296/107.07
(58) Field of Search ............................. 296/107.08, 224, 296/221, 107.17, 219, 210, 147

(56) References Cited

U.S. PATENT DOCUMENTS

| | | | | |
|---|---|---|---|---|
| 2,007,873 A | * | 7/1935 | Paulin | 296/107.08 |
| 2,181,869 A | * | 12/1939 | Carr | 296/107.08 |
| 2,747,928 A | * | 5/1956 | Olivier et al. | 296/107.08 |
| 4,778,215 A | * | 10/1988 | Ramaciotti | 296/107.07 |
| 5,743,587 A | * | 4/1998 | Alexander et al. | 296/108 |
| 5,769,483 A | * | 6/1998 | Danzl et al. | 296/107.08 |
| 5,803,530 A | * | 9/1998 | Skrzypek et al. | 296/180.1 |
| 6,019,416 A | * | 2/2000 | Beierl | 296/107.08 |
| 6,039,382 A | * | 3/2000 | Mather et al. | 296/107.08 |
| 6,145,915 A | * | 11/2000 | Queveau et al. | 296/107.08 |
| 6,315,349 B1 | * | 11/2001 | Kinnanen | 296/107.01 |
| 2001/0005086 A1 | * | 6/2001 | Neubrand | 296/107.08 |
| 2001/0024050 A1 | * | 9/2001 | Schutt et al. | 296/107.08 |
| 2001/0040386 A1 | * | 11/2001 | Miklosi et al. | 296/107.08 |
| 2002/0171258 A1 | * | 11/2002 | Obendiek | 296/107.08 |
| 2003/0020296 A1 | * | 1/2003 | Koch et al. | 296/107.08 |
| 2003/0020297 A1 | * | 1/2003 | Koch | 296/107.08 |

FOREIGN PATENT DOCUMENTS

| | | |
|---|---|---|
| DE | 3801148 C1 | 4/1989 |
| DE | 4446483 C2 | 2/1998 |
| DE | 19714105 A1 | 10/1998 |
| DE | 10051615 A1 | 5/2001 |
| EP | 0882615 A1 | 12/1998 |
| EP | 1038710 A1 | 9/2000 |
| FR | 2802477 A1 | 12/1999 |

* cited by examiner

Primary Examiner—Kiran Patel
(74) Attorney, Agent, or Firm—Crowell & Moring LLP

(57) ABSTRACT

With a cover device for a folding top compartment of a vehicle with a lowerable roof structure, in particular for a hardtop vehicle, it is possible to pivot the roof structure into the folding top compartment arranged behind a front region in a back part of the vehicle bodywork. The compartment can be closed with a folding top compartment lid which can be folded up towards the rear. A cover unit with two lateral cover parts can close a free space which is formed between the closed folding top compartment lid and the rear region. In order to simplify actuation of the individual cover parts, the lateral cover parts are pivotably mounted on the folding top compartment lid in such a way that, in an active position, the lateral cover parts adjoin the front edge region of the folding top compartment lid and, in a passive position, they bear against the underside of the folding top compartment lid.

25 Claims, 5 Drawing Sheets

COVER DEVICE FOR A FOLDING TOP COMPARTMENT

This application claims the priority of German application 101 34 370.1, filed Jul. 14, 2001, the disclosure of which is expressly incorporated by reference herein.

BACKGROUND AND SUMMARY OF THE INVENTION

Attention is directed to co-pending U.S. patent application Ser. Nos. 10/193,668 and 10/193,676, both titled COVER DEVICE FOR A FOLDING TOP COMPARTMENT, filed Jul. 12, 2002 and having the same assignee as the present application.

The present invention relates to a cover device for a folding top compartment of a vehicle with a lowerable roof structure, in particular for a hardtop vehicle, by which it is possible to pivot the roof structure into the folding top compartment arranged behind a rear region in a back part of the vehicle bodywork. The device includes a folding top compartment lid by which the folding top compartment can be closed and which can be folded up towards the rear of the vehicle, a free space remaining between a front edge region of the closed folding top compartment lid and a rear edge region of the rear region, and a cover unit by which the free space can be closed. The cover unit has two lateral cover parts which are adjustable between an active position, in which each lateral cover part closes off a passage opening for a C pillar region of the roof structure, and a passive position, in which each lateral cover part clears the passage opening for the C pillar region.

German Patent Publication DE 44 46 483 C2 discloses such a cover device for a hardtop vehicle in which the roof structure has a front roof part and a rear window part connected thereto. The roof structure can be pivoted, by means of a positive control device supported on the bodywork, into the folding top compartment arranged behind a rear region in a back part of the vehicle bodywork. This folding top compartment can be closed with a folding top compartment lid which can be folded up towards the rear. In this process, a free space, which can be closed by means of a cover unit, is formed between a front edge region of the closed folding top compartment lid and a rear edge region of the rear region. This cover unit has a front cover part, a central cover part and a rear cover part, as well as two lateral cover parts. These cover parts form, in a closed position of the cover unit with the roof structure lowered, an essentially planar and virtually uninterrupted cover of the free space, which cover adjoins in a flush fashion the rear region and the closed folding top compartment lid. The lateral cover parts can be adjusted between an active position, in which each lateral cover part closes a passage opening for a C pillar region of the roof structure, and a passive position, in which each lateral cover part clears the passage opening for the C pillar region.

In the known cover device, the lateral cover parts are pivotably mounted on a folding device to which, in addition, the central cover part and the rear cover part are connected. The bearing of the lateral cover parts is embodied here in such a way that, in an upright folded position of the rear and central cover parts the cover parts are positioned vertically and are pivoted inwards on to the front side of the upright central cover part towards the center of the vehicle. It is necessary for the cover parts to be able to fold and pivot in order to clear the adjustment path necessary for the pivoting of the roof structure. When the roof structure is closed, the lateral cover parts remain in their position pivoted in onto the upper side of the central cover part in order to be able to clear the passage opening for the C pillar region. In this design, the lateral cover elements with the region of the parcel shelf formed by the other three cover parts require interior space in the vehicle and can be felt to be disruptive by the respective vehicle occupant. In the known cover device, the expenditure for implementing the kinematics provided for the lateral cover parts is relatively large.

One problem with which the present invention is concerned is the problem of specifying, for a cover device of the type mentioned at the beginning, an advantageous embodiment which has relatively economical design. Furthermore, the cover device is to require relatively little interior space.

A solution to this problem is achieved, according to the invention, by way of a cover device having lateral cover parts pivotably mounted on a folding top compartment lid in such a way that, in their active positions, the lateral cover parts adjoin the front edge region of the folding top compartment lid and, in their passive positions, the lateral cover parts bear against the underside of the folding top compartment lid. Advantageous embodiments are defined by the dependent claims of this application. By bearing of the lateral cover parts on the folding top compartment lid as proposed, according to the invention, the cover parts can be adjusted mechanically independently of the other cover parts. As a result, possibilities of simplifying the measures provided for adjusting the lateral cover parts, for example for a corresponding actuator drive, are provided. By adjusting the lateral cover parts in the passive position provided on the underside of the folding top compartment lid, the lateral cover parts are folded away from the interior of the vehicle when they are not required. As a result, the aesthetics of the cover unit when the roof structure is closed are considerably improved.

According to one preferred embodiment, each lateral cover part can be pivotably mounted about a pivot axis which runs at an incline with respect to a horizontal plane and with respect to a vertical plane running transversely with respect to the longitudinal direction of the vehicle. By means of this measure, a passive position which is adapted to a curvature which may be present on the inside or underside of the folding top compartment lid can be realized for each lateral cover part with only one degree of freedom of movement. As a result, the folded-away lateral cover parts can be accommodated in the most space-saving way possible.

A cutout, into which the respective cover part pivots in its passive position, can preferably be formed for each lateral cover part on the underside of the folding top compartment lid. In this way, in their passive position, the cover parts are integrated into the contour of the underside of the folding top compartment lid so that interfering contours are avoided.

Further important features and advantages of the present invention will be apparent from the dependent claims, from the drawings and from the associated description of the figures with reference to the drawings.

It goes without saying that the features which are mentioned above and are to be explained below can be used not only in the respectively given combination but also in other combinations or in isolation without departing from the scope of the present invention.

A preferred exemplary embodiment of the invention is illustrated in the drawings and will be explained in more detail in the following description.

BRIEF DESCRIPTION OF THE DRAWINGS

In the drawings, which are each schematic.

DETAILED DESCRIPTION OF THE INVENTION

Figure 1:
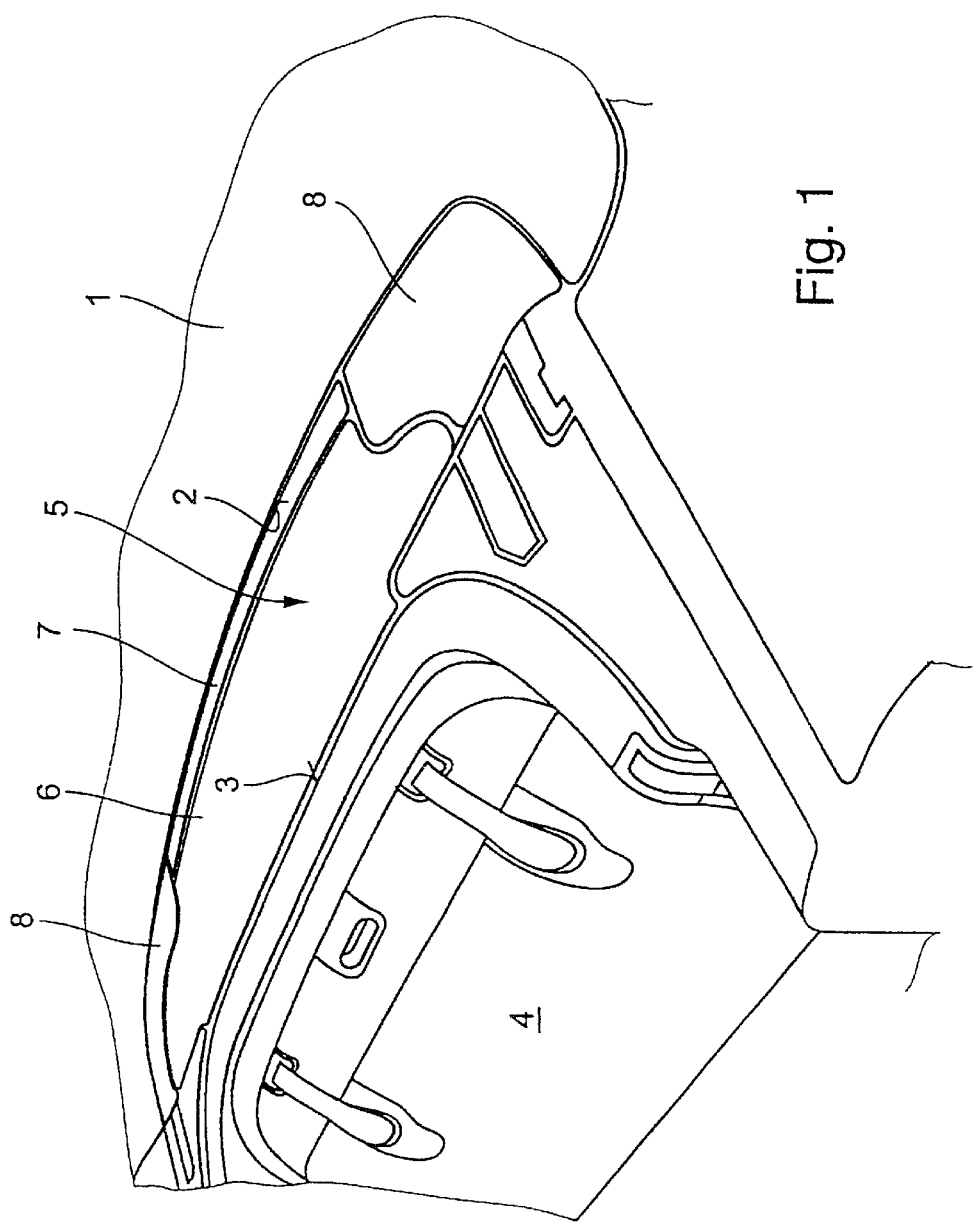
FIG. 1 shows a perspective view of a back part of a passenger car equipped with a cover device according to the invention with the roof structure lowered.

FIG. 1 shows a rear view of a passenger car (otherwise not illustrated) which has a lowerable roof structure so that the vehicle is what is referred to as a convertible. The roof structure is preferably what is referred to as a hardtop, that is to say a roof structure with shell elements made of metal or plastic. Likewise, a roof structure as a soft top, in which the lowerable roof is essentially comprised of a fabric material, is also possible. At the back of the vehicle, a folding top compartment is formed for accommodating the lowered roof structure. This folding top compartment can be closed with a folding top compartment lid 1, which is mounted on the vehicle bodywork so as to make it fold up towards the rear in order to open the folding top compartment. If, next to or below the space for accommodating the roof structure, the folding top compartment contains an additional storage space, referred to as boot, the folding top compartment lid 1 can also be embodied so that it can fold up forwards in order to open this boot.

When the folding top compartment lid 1 is closed, a free space remains between a front edge region 2 of the folding top compartment lid 1 and a rear edge region 3 of the rear region 4 of the vehicle. This free space is closed in FIG. 1 by a cover unit 5 which has a front cover part 6, a rear cover part 7 and two lateral cover parts 8. When the roof structure is lowered, the free space between the folding top compartment lid 1 and rear region 4 is closed essentially without gaps by the four cover parts 6, 7, 8 of the cover unit 5. The cover parts 6, 7, 8 adjoin, approximately flush, the outer contour of the folding top compartment lid 1 and of the rear edge region 3 of the rear region 4.

When the roof structure is closed, the rear cover part 7 and the lateral cover parts 8 are folded away. A gap 17 (cf. FIG. 3) which is cleared by the folded-away, rear cover part 7 is penetrated by a rear and lower edge region of the extended roof structure, while each of the folded-away, lateral cover parts 8 clears a passage opening 18 (cf. FIG. 3) for a C pillar or a C pillar region of the closed roof structure. The front cover part 6 forms a parcel shelf in the interior of the vehicle in the closed position when the roof structure is closed.

The front cover part 6 is mounted so as to be capable of pivoting on the vehicle bodywork, while the rear cover part 7 is mounted so as to be capable of pivoting on the front cover part 6. The lateral cover parts 8 are mounted so as to be capable of pivoting on the folding top compartment lid 1. This mounting of the individual cover parts 6, 7, 8 permits specific adjustment kinematics to be achieved, which will be explained in more detail with reference to FIGS. 2 to 5. Only the cover parts 6, 7, 8 of the cover unit 5 and of the folding top compartment lid are illustrated, in various positions, in these figures.

Figure 2:
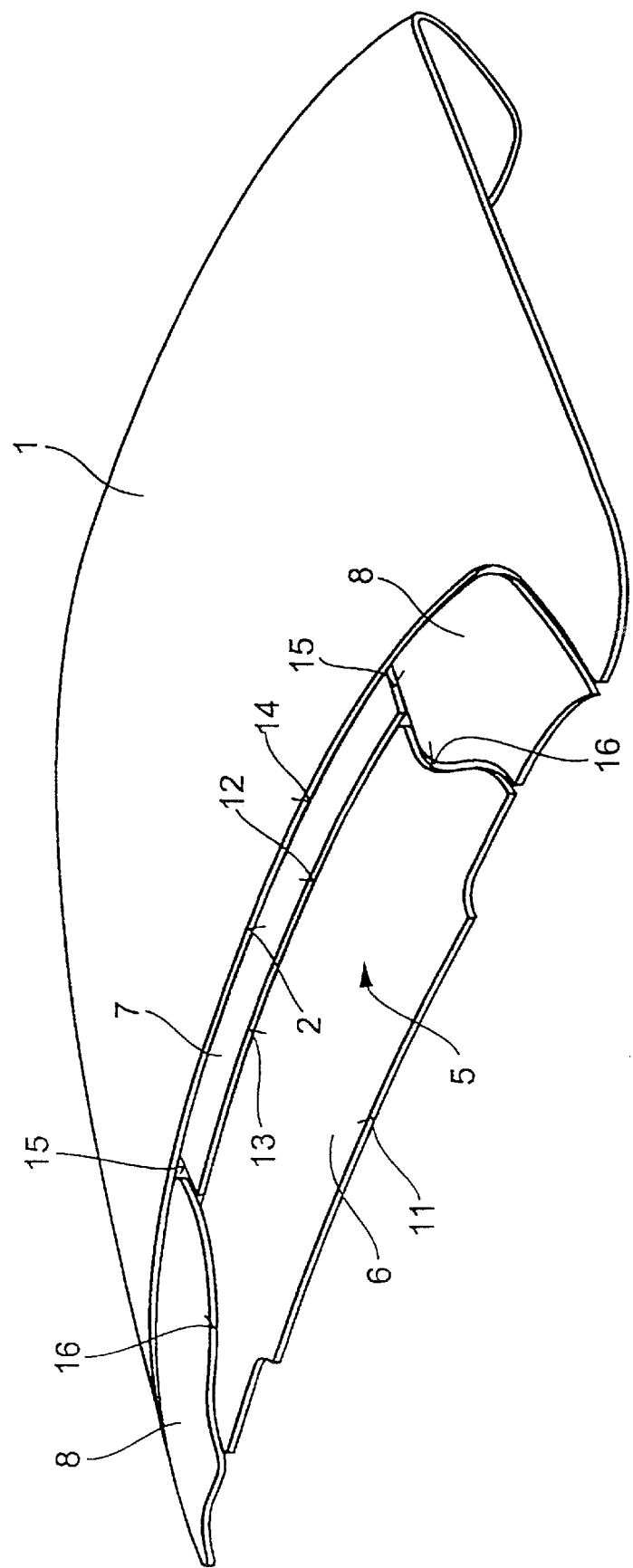
FIG. 2 shows a perspective view of a cover unit of the cover device according to the invention and of a folding top compartment lid of the motor vehicle (otherwise not illustrated) with the roof structure lowered.

In FIG. 2, the roof structure 10 is stowed away in the folding top compartment and the cover unit 5 is located in its closed position so that all the cover parts 6, 7, 8 serve to close the free space with an integrated shape. In the process, the lateral cover parts 8 and the rear cover part 7 are folded out.

In the position shown in FIG. 2, the front cover part 6 adjoins, with a front edge region 11, the rear edge region 3 of the rear region 4 (cf. FIG. 1). With a rear edge region 12, the front cover part 6 adjoins a front edge region 13 of the rear cover part 7. The rear cover part 7, for its part, adjoins, with a rear edge region 14, the front edge region 2 of the folding top compartment lid 1. The lateral cover parts 8 adjoin both the front edge region 2 of the folding top compartment lid 1 and lateral edge regions 15 and 16 of the rear cover part 7 and of the front cover part 6. Moreover, the lateral cover parts 8 adjoin the rear edge region 3 of the rear region 4 (cf. FIG. 1).

In order to close the roof structure, the folding top compartment lid 1 is first folded up towards the rear. The lateral cover parts 8 which are coupled thereto remain folded out. The front cover part 6 is then folded up towards the front. The rear cover part 7 which is mounted thereon is simultaneously folded away onto the underside of the front cover part 6. In this way, a sufficiently large adjustment path is cleared for the roof structure. The adjustment path permits the roof structure to pivot out of the folding top compartment over the passenger space of the vehicle. When the roof structure is closed, the front cover part 6 is then again folded back rearwards and downwards. The rear cover part 7, however, remains in its folded-away state on the underside of the front cover part 6. Before the folding top compartment lid 1 is folded back forwards and downwards, the lateral cover parts 8 are folded away onto the underside of the folding top compartment lid.

Figure 3:
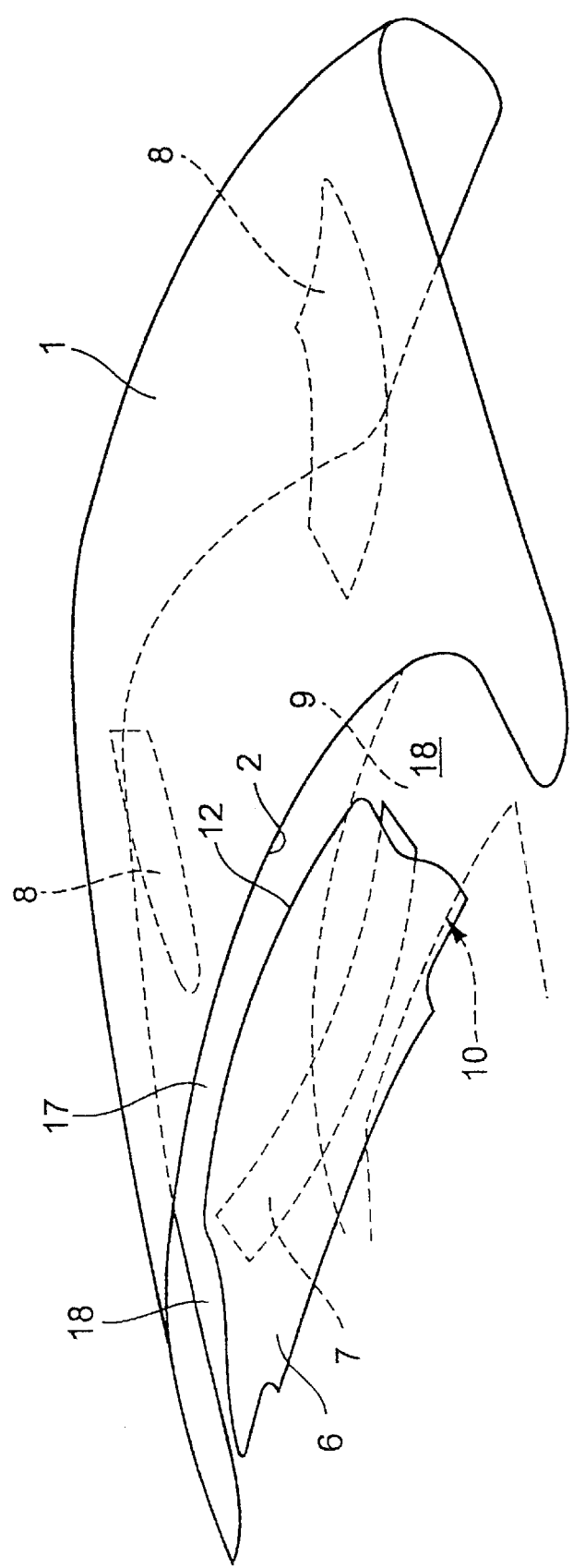
FIG. 3 shows a view similar to that of FIG. 2 but with the roof structure closed and in which the roof structure is only partially shown.

FIG. 3 shows the state which is obtained when the roof structure is closed, the free space is closed and the folding compartment is closed. In this state, the front cover part 6 and the folding top compartment lid 1 are in the same closed position which they also assume in FIG. 2 when the roof structure is lowered in order to close the free space and folding compartment. However, in contrast to FIG. 2, in this state the rear cover part 7 is folded away onto the underside of the front cover part 6, and the lateral cover parts 8 are folded away onto the underside of the folding top compartment lid 1.

When the rear cover part 7 is folded away, a gap 17, which is penetrated by a lower and rear edge region (not illustrated) of the roof structure, is formed between the rear edge region 12 of the front cover part 6 and the front edge region 2 of the folding top compartment lid 1. The folded-away lateral cover parts 8 each leave behind a passage opening 18 for one of the C pillars of the closed roof structure which is indicated with broken lines and designated by 10, between the front cover part 6 and folding top compartment lid 1. The C pillar or the C pillar region penetrating the passage opening 18 is designated here by 9. When the roof structure 10 is closed, the folded-away cover parts 7 and 8 are thus invisible, resulting in a particularly aesthetically attractive interior. This is possible in particular by virtue of the fact that the dimensioning of the lateral cover flaps 8 and of the rear cover flap 7 is selected such that when the roof structure 10 is closed, the front cover part 6 adjoins, with its rear edge region 12, the lower, inner edge region of the roof structure 10 essentially seamlessly.

Figure 4:
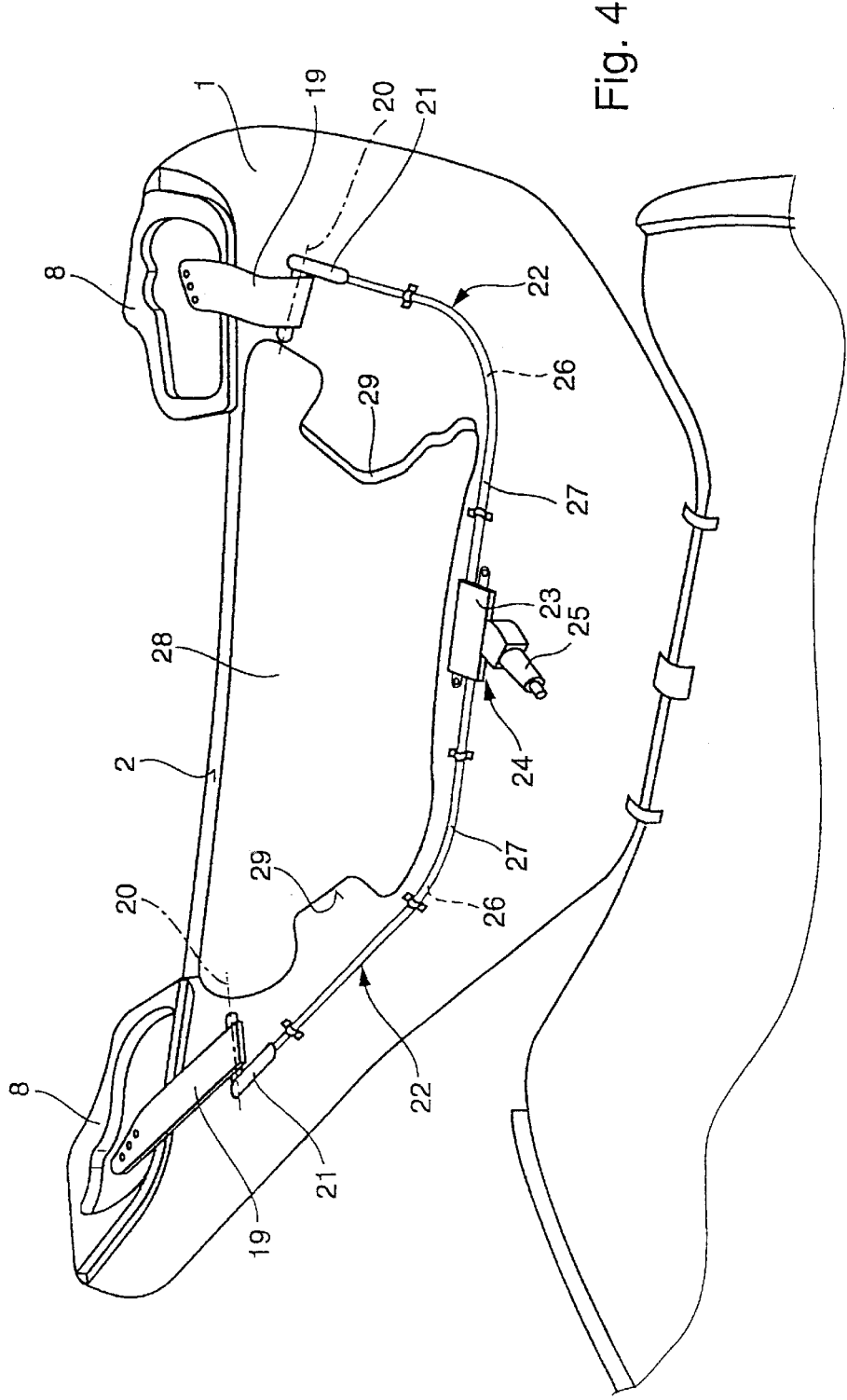
FIG. 4 shows a perspective view of the back part of the vehicle with one folding top compartment lid folded up towards the rear and lateral cover parts folded out.
Figure 5:
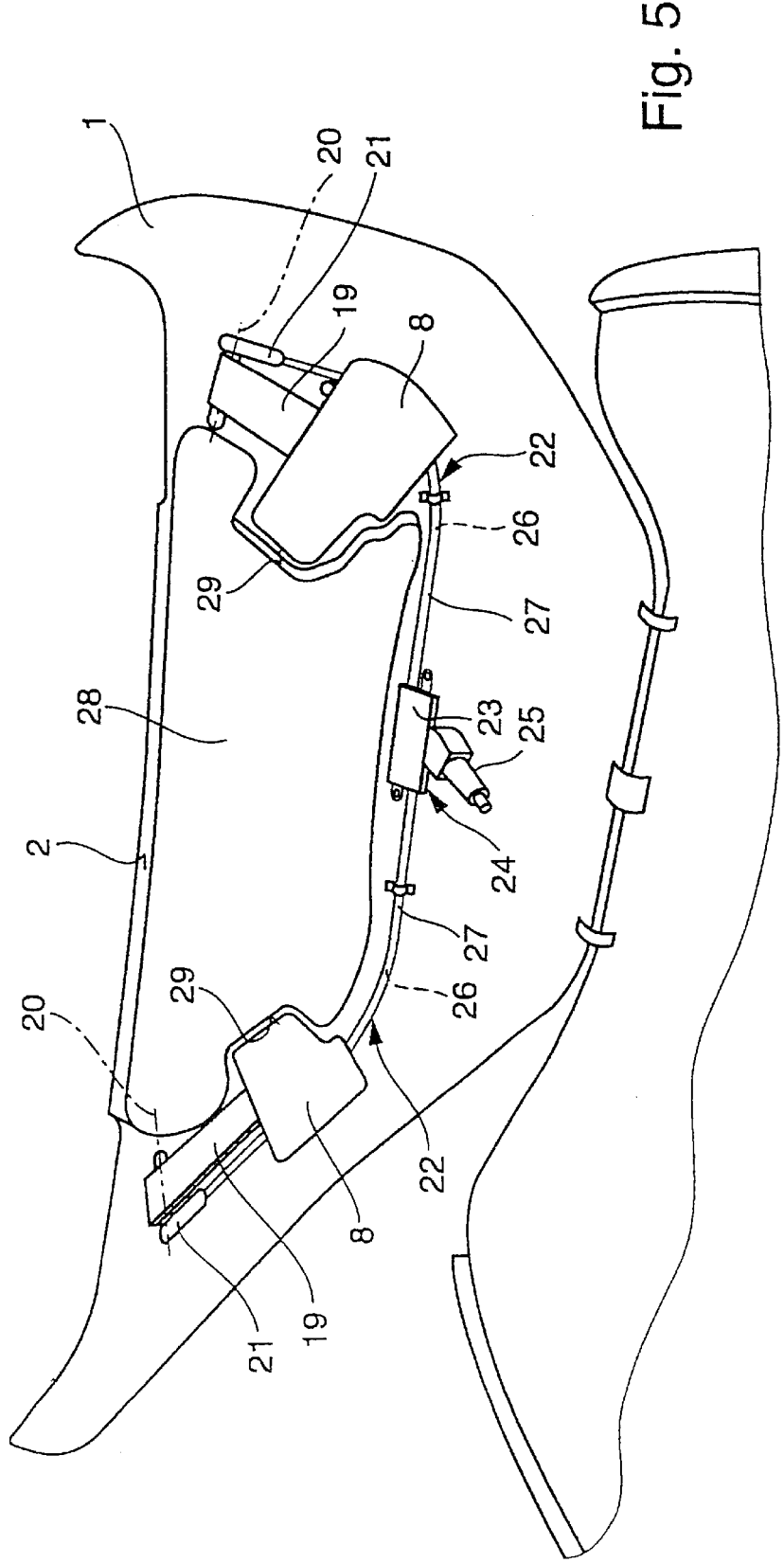
FIG. 5 shows a view similar to that of FIG. 4 but with the lateral cover parts folded away.

FIGS. 4 and 5 show a perspective view of the underside of the folding top compartment lid 1 which is folded up towards the rear in order to open the folding top compartment. The lateral cover parts 8 are folded out into their active positions in FIG. 4 and form a prolongation of the folding top compartment lid 1 made with an integrated shape. The lateral cover parts 8 in FIG. 5 are folded away onto the underside of the folding top compartment lid,1 into their passive position in a space-saving fashion.

According to FIGS. 4 and 5, each of the lateral cover parts 8 is mounted on its underside on a pivot arm 19 which is mounted on its end facing away from the respective cover part 8 so as to be capable of pivoting about a pivot axis 20 on the underside of the folding top compartment lid 1. Each pivot arm 19 is connected here, fixed in terms of rotation, to a drive shaft (not shown here) which runs coaxially with respect to the pivot axis 20 to the bearing of the pivot arm 19. Each drive shaft has a drive connection to a lateral gearbox 21. The respective drive shaft is connected to the output of the respective gearbox 21. The input of the respective gearbox 21 is connected to a push-pull cable unit 22. Each of the lateral gearboxes 21 is constructed in such a way that the input-end linear adjustments are converted into output-end rotary adjustments and correspondingly transmitted to the drive shaft.

Each of the two push-pull cable units 22 is connected in each case to an output of a central gearbox 23 of a central drive unit 24. This drive unit 24 also comprises a rotary drive 25 which is connected to the input of the central gearbox 23, and is embodied, for example, as an electric motor. The central gearbox 23 is constructed in such a way that it converts input-end rotary adjustments into output-end linear adjustments which are transmitted synchronously to the two push-pull cable units 22 which are connected to the output end.

Each of the aforesaid push-pull cable units 22 is preferably composed of a flexible cable 26 which is rigid under compression and under tension and is laid in a flexible sleeve which is rigid under compression and under tension. The ends of the cable 26 which emerge from the sleeve 27 are expediently embodied as a tubular element or rod element which is flexurally rigid and rigid under compression and tension and is particularly suitable for connection to the lateral gearboxes 21 or to the central gearbox 23.

In order to be able to pivot the folded-out lateral cover parts 8 from their active position (shown in FIG. 4) in which, according to FIG. 2, they close the respective passage opening 18, into the passive position (represented in FIG. 5) in which they clear the passage openings 18, the rotary drive 25 is actuated by a corresponding control unit (not illustrated) and then applies a rotary adjustment to the input of the central gearbox 23. Linear adjustments are thus applied to the cables 26 of the push-pull cable unit 23 and the outputs of the central gearbox 23. As a result, the linear adjustments are transmitted to the inputs of the lateral gearboxes 21. A rotary adjustment then takes place again at the outputs of the lateral gearboxes 21 and is transmitted via the respective drive shaft to the assigned pivot arm 19. Correspondingly, the pivot arms 19 and thus the lateral cover parts 8 which are permanently attached to them, carry out the desired pivoting adjustment about the pivot axis 20 until the passive position shown in FIG. 5 is reached. In order to be able to reach this passive position, it may be expedient to orient the pivot axes 20 spatially in such a way that they run at an incline with respect to a horizontal plane and/or with respect to a vertical plane running transversely with respect to the longitudinal direction of the vehicle.

In the embodiment shown here, the folding top compartment lid 1 has, on its underside, a reinforcing part or structural part 28 into which a cutout 29 is made on each side. As is apparent from FIG. 5, the kinematics of the lateral cover parts 8 are selected such that, in their passive position, they pivot into the respective cutout 29 with an integrated shape. In this way, interfering contours on the inside or underside of the folding top compartment lid 1 can be reduced or avoided.

As is apparent from FIGS. 4 and 5, the entire drive of the lateral cover parts 8 is arranged on the underside of the folding top compartment lid 1 so that the adjustment of the lateral cover parts 8 is mechanically isolated from the adjustment of the roof structure and of the front cover part 6 and of the rear cover part 7. The synchronization of the course of the movement of the lateral cover parts 8 with the courses of the movements of the other cover parts 6, 7 and of the roof structure can be carried out by an electrical and/or electronic connection, for example by suitable sensors and switches.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

We claim:

1. A cover device for a folding top compartment of a vehicle with a lowerable roof structure, by which it is possible to pivot the roof structure into the folding top compartment arranged behind a rear region in a back part of the vehicle bodywork, comprising:
   a folding top compartment lid by which the folding top compartment can be closed and which can be folded up towards the rear of the vehicle, a free space remaining between a front edge region of the closed folding top compartment lid and a rear edge region of the rear region,
   a cover unit by which the free space can be closed which has two lateral cover parts, said lateral cover parts being adjustable between an active position, in which each lateral cover part closes off a passage opening for a C pillar region of the roof structure, and a passive position, in which each lateral cover part clears the passage opening for the C pillar region,
   wherein the lateral cover parts are pivotably mounted on a said folding top compartment lid in such a way that in their active positions, the lateral cover parts adjoin the front edge region of the folding top compartment lid, and in their passive positions, the lateral cover parts bear against the underside of the folding top compartment lid.

2. The cover device according to claim 1, wherein each lateral cover part is mounted so as to be pivotable about a pivot axis which runs at an incline with respect to a horizontal plane and with respect to a vertical plane running transversely with respect to the longitudinal direction of the vehicle.

3. The cover device according to claim 1, wherein a cutout, into which one of the cover parts pivots in its passive position, is formed for each lateral cover part on the underside of the folding top compartment lid.

4. The cover device according to claim 1, wherein each lateral cover part is mounted on the folding top compartment lid by a pivot arm, and wherein each pivot arm is permanently attached to a respective cover part and pivotably mounted on the folding top compartment lid.

5. The cover device according to claim 4, wherein each pivot arm is connected so as to be fixed in terms of rotation to a drive shaft which runs coaxially with respect to a bearing of a respective cover part, and wherein each drive shaft is connected to an output of a lateral gearbox which converts input-end linear adjustments into output-end rotary adjustments.

6. The cover device according to claim 5, and further comprising a central drive unit provided for adjusting both lateral cover parts, said drive unit generating linear adjustments at an output end, and transmission units which transmit linear adjustments from the output of the drive unit to an input of each of the lateral gearboxes.

7. The cover device according to claim 6, wherein the transmission unit for each lateral gearbox has a flexible cable which is rigid under compression and under tension and is laid in a flexible sleeve which is rigid under compression and under tension and connects an output of the central drive unit to the input of one of the lateral gearboxes.

8. The cover device according to claim 6, wherein the central drive unit has a rotary drive and a central gearbox which converts input-end rotary adjustments into output-end linear adjustments, and wherein the rotary drive is connected to an input of the central gearbox.

9. The cover device according to claim 6, wherein the central drive unit is mounted on the underside of the folding top compartment lid.

10. The cover device according to claim 6, and further comprising a control provided for activating the central drive unit which is electrically, electronically, or both electrically and electronically coupled to a positive control device for adjusting the roof structure.

11. The cover device according to claim 2, wherein a cutout, into which one of the cover parts pivots in its passive position, is formed for each lateral cover part on the underside of the folding top compartment lid.

12. The cover device according to claim 2, wherein each lateral cover part is mounted on the folding top compartment lid by a pivot arm, and wherein each pivot arm is permanently attached to a respective cover part and pivotably mounted on the folding top compartment lid.

13. The cover device according to claim 3, wherein each lateral cover part is mounted on the folding top compartment lid by a pivot arm, and wherein each pivot arm is permanently attached to a respective cover part and pivotably mounted on the folding top compartment lid.

14. The cover device according to claim 12, wherein each pivot arm is connected so as to be fixed in terms of rotation to a drive shaft which runs coaxially with respect to a bearing of a respective cover part, and wherein each drive shaft is connected to an output of a lateral gearbox which converts input-end linear adjustments into output-end rotary adjustments.

15. The cover device according to claim 14, and further comprising a central drive unit provided for adjusting both lateral cover parts, said drive unit generating linear adjustments at an output end, and transmission units which transmit linear adjustments from the output of the drive unit to an input of each of the lateral gearboxes.

16. The cover device according to claim 15, wherein the transmission unit for each lateral gearbox has a flexible cable which is rigid under compression and under tension and is laid in a flexible sleeve which is rigid under compression and under tension and connects an output of the central drive unit to the input of one of the lateral gearboxes.

17. The cover device according to claim 15, wherein the central drive unit has a rotary drive and a central gearbox which converts input-end rotary adjustments into output-end linear adjustments, and wherein the rotary drive is connected to an input of the central gearbox.

18. The cover device according to claim 15, wherein the central drive unit is mounted on the underside of the folding top compartment lid.

19. The cover device according to claim 15, and further comprising a control provided for activating the central drive unit which is electrically, electronically, or both electrically and electronically coupled to a positive control device for adjusting the roof structure.

20. The cover device according to claim 13, wherein each pivot arm is connected so as to be fixed in terms of rotation to a drive shaft which runs coaxially with respect to a bearing of a respective cover part, and wherein each drive shaft is connected to an output of a lateral gearbox which converts input-end linear adjustments into output-end rotary adjustments.

21. The cover device according to claim 20, and further comprising a central drive unit provided for adjusting both lateral cover parts, said drive unit generating linear adjustments at an output end, and transmission units which transmit linear adjustments from the output of the drive unit to an input of each of the lateral gearboxes.

22. The cover device according to claim 21, wherein the transmission unit for each lateral gearbox has a flexible cable which is rigid under compression and under tension and is laid in a flexible sleeve which is rigid under compression and under tension and connects an output of the central drive unit to the input of one of the lateral gearboxes.

23. The cover device according to claim 21, wherein the central drive unit has a rotary drive and a central gearbox which converts input-end rotary adjustments into output-end linear adjustments, and wherein the rotary drive is connected to an input of the central gearbox.

24. The cover device according to claim 21, wherein the central drive unit is mounted on the underside of the folding top compartment lid.

25. The cover device according to claim 21, and further comprising a control provided for activating the central drive unit which is electrically, electronically, or both electrically and electronically coupled to a positive control device for adjusting the roof structure.

* * * * *